United States Patent
Ogihara (10) Patent No.: US 7,102,978 B2
(45) Date of Patent: Sep. 5, 2006

(54) MULTI-FORMAT OPTICAL DISK DEVICE AND OPTICAL DISK RECORDING AND/OR REPRODUCING METHOD

(75) Inventor: Koichiro Ogihara, Tokyo (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 10/344,215

(22) PCT Filed: Jun. 10, 2002

(86) PCT No.: PCT/JP02/05720

§ 371 (c)(1),
(2), (4) Date: Aug. 4, 2003

(87) PCT Pub. No.: WO02/101741

PCT Pub. Date: Dec. 19, 2002

(65) Prior Publication Data

US 2004/0032809 A1    Feb. 19, 2004

(30) Foreign Application Priority Data

Jun. 11, 2001    (JP)    ............................. 2001-174926

(51) Int. Cl.
*G11B 7/005*    (2006.01)

(52) U.S. Cl. .................................... 369/59.17; 369/52.1
(58) Field of Classification Search .............. 369/59.17
See application file for complete search history.

(56) References Cited

U.S. PATENT DOCUMENTS

| | | | | |
|---|---|---|---|---|
| 6,034,937 A | * | 3/2000 | Kumagai | ................. 369/47.26 |
| 6,519,213 B1 | * | 2/2003 | Song et al. | .............. 369/44.26 |
| 2003/0002410 A1 | * | 1/2003 | Senshu | ..................... 369/47.48 |

FOREIGN PATENT DOCUMENTS

| | | |
|---|---|---|
| JP | 10-198965 | 7/1998 |
| WO | WO 98/27553 | 6/1998 |

* cited by examiner

*Primary Examiner*—Andrea Wellington
*Assistant Examiner*—Lixi Chow
(74) *Attorney, Agent, or Firm*—Oblon, Spivak, McClelland, Maier & Neustadt, P.C.

(57) ABSTRACT

The present invention is applied to an optical disk apparatus which records data on and/or plays back data from one of a variety of DVD optical disks. The present invention generates a binarization threshold S3 by offsetting an envelope S2 of a playback signal RF by an offset voltage V1, and binarizes the playback signal RF (S4) according to the binarization threshold.

10 Claims, 5 Drawing Sheets

10: DEMODULATOR

MULTI-FORMAT OPTICAL DISK DEVICE AND OPTICAL DISK RECORDING AND/OR REPRODUCING METHOD

TECHNICAL FIELD

The present invention relates to an optical disk apparatus and a recording method and/or a playback method of an optical disk, and is applied to an optical disk apparatus that records data to and plays back data from an optical disk complied with the DVD standards. In accordance with the present invention, management information recorded in a bar-code form is reliably played back from a variety of optical disks by offsetting the envelope of a playback signal by an offset to generate a binarization threshold, and then binarizing the playback signal according to the binarization threshold.

BACKGROUND ART

Conventionally, management information is recorded in a bar-code form on an inner track of a DVD optical disk, and is used to manage the optical disk.

Figure 1:
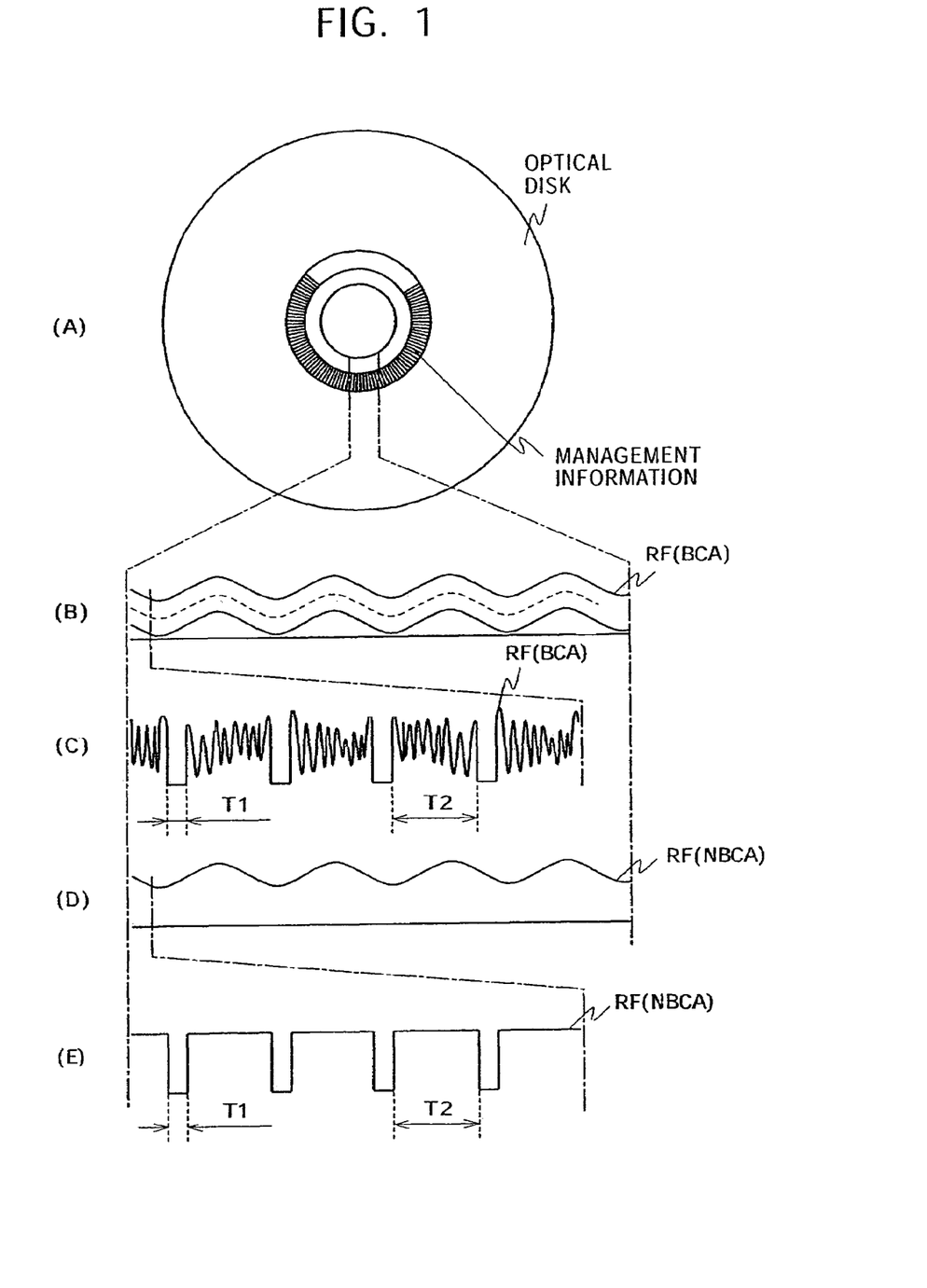
FIG. 1 is a diagram illustrating management information.

The management information includes information to inhibit copying data, and identification information unique to the optical disk. As shown in FIG. 1(A), a high-power laser beam from a YAG laser is directed to an inner track inside of the ordinary data recording area of the optical disk, thereby recording the management information by successively evaporating a material on an information recording surface in radial directions. In an ROM disk, the high-power laser beam evaporates a reflective aluminum film. In a recordable disk, the high-power laser beam evaporates a color film and a reflective film (of Au, Ag, etc.). In a rewritable disk, the high-power laser beam evaporates a phase-change film and a reflective film (of Au, Ag, etc.).

In DVD-ROM and DVD-RAM optical disks, the management information is recorded on a BCA (Burst Cutting Area). The BCA is formed within a range of from 22.3 (+0 and −0.8) through 23.5 (+0.1, −0.1) [mm] from the center hole of the disk. In DVD-R and DVD-RW optical disks, the management information is recorded on an NBCA (Narrow Burst Cutting Area). In the DVD-R optical disk, the NBCA is formed within a range of from 22.71 (+0.06, −0.06) through 23.51 (+0.06, −0.06) [mm], and in the DVD-RW optical disk, the NBCA is formed within a range of from 22.7 (+0.05, −0.05) through 23.5 (+0.05, −0.05) [mm].

The management information is recorded using the RZ modulation, and a playback signal RF (see FIGS. 1(B)–1(E)) obtained with tracking servo control deactivated is binarized and played back.

The above-mentioned BCA and NBCA ares are pre-pit areas in the DVD-ROM and DVD-RAM optical disks where embossed pits are formed beforehand. In these optical disks, a variation in signal level due to pits (the variation in the signal level having a short period as shown in FIG. 1(C)) is superimposed on the playback signal RF (BCA) (see FIGS. 1(B) and 1(C)) obtained when the management information is played back. In contrast, in the DVD-R and DVD-RW optical disks having no pits in the concerned area thereof, no similar variations are observed in the playback signal RF (NBCA) (see FIGS. 1(D) and 1(E)) when the management information is obtained. Referring to FIGS. 1(C) and 1(E), T1 is 3±1.5 [μsec], and T2 is 8.89n±2 [μsec], where n is 1, 2, 3 or 4.

The optical disk apparatus that records data to and/or plays back data from a variety of these optical disks must reliably play back data from any of these optical disks.

The playback signal RF obtained from the BCA and NBCA where the management information is recorded has features different from disk type to disk type and from disk to disk. Specifically, the playback signal obtained from the BCA and NBCA varies in the degree of modulation from disk to disk. When the optical disk is decentered, the modulation by the surface of a mirror changes (a variation in the signal level having a large period as shown in FIGS. 1(B) and 1(D)).

In these optical disks, it is difficult to set an appropriate binarization threshold value when the playback signal obtained from the BCA and NBCA is binarized. Consequently, a reliable playback of the management information from a variety of these optical disks is difficult.

DISCLOSURE OF THE INVENTION

The present invention has been developed in view of the above problems, and it is an object of the present invention to provide an optical disk apparatus and a recording method and/or a playback method of an optical disk, wherein management information recorded in a bar-code form is reliably played back from a variety of optical disks.

To resolve the above mentioned problem, the present invention is applied to an optical disk apparatus and includes envelope detector means which detects an envelope signal of a playback signal, offset means which generates a binarization threshold signal by offsetting the envelope signal by an offset voltage, bandwidth limiter means which limits a high-frequency signal level variation of the playback signal, and binarizing means which binarizes an output signal of the bandwidth limiter means according to the binarization threshold signal as a reference to generate a binary signal.

Since the optical disk apparatus of the present invention includes the envelope detector means which detects the envelope signal of the playback signal, the offset means which generates a binarization threshold signal by offsetting the envelope signal by the offset voltage, the bandwidth limiter means which limits a high-frequency signal level variation of the playback signal, and the binarizing means which binarizes the output signal of the bandwidth limiter means according to the binarization threshold signal as a reference to generate the binary signal, the signal level of the binarization threshold signal is appropriately set and the playback signal is binarized even when the playback signal is varied in the signal level from optical disk type to optical disk type and from optical disk to optical disk. The management information recorded in a bar-code form is reliably played back from any of a variety of optical disks.

The present invention is applied to a method for recording data on an optical disk and/or playing back data recorded on the optical disk and includes the steps of detecting an envelope signal, generating a binarization threshold signal by offsetting the envelope signal by an offset voltage, and binarizing the playback signal according to the binarization threshold signal as a reference to generate a binary signal, subsequent to limiting a high-frequency signal level variation of the playback signal.

The present invention thus provides the method for recording data on the optical disk and/or playing back data recorded on the optical disk wherein the management information recorded in a bar-code form is reliably played back from any of a variety of optical disks.

BEST MODE FOR CARRYING OUT THE INVENTION

The embodiments of the present invention will now be discussed with reference to the drawings.

(1) Construction of First Embodiment

Figure 2:
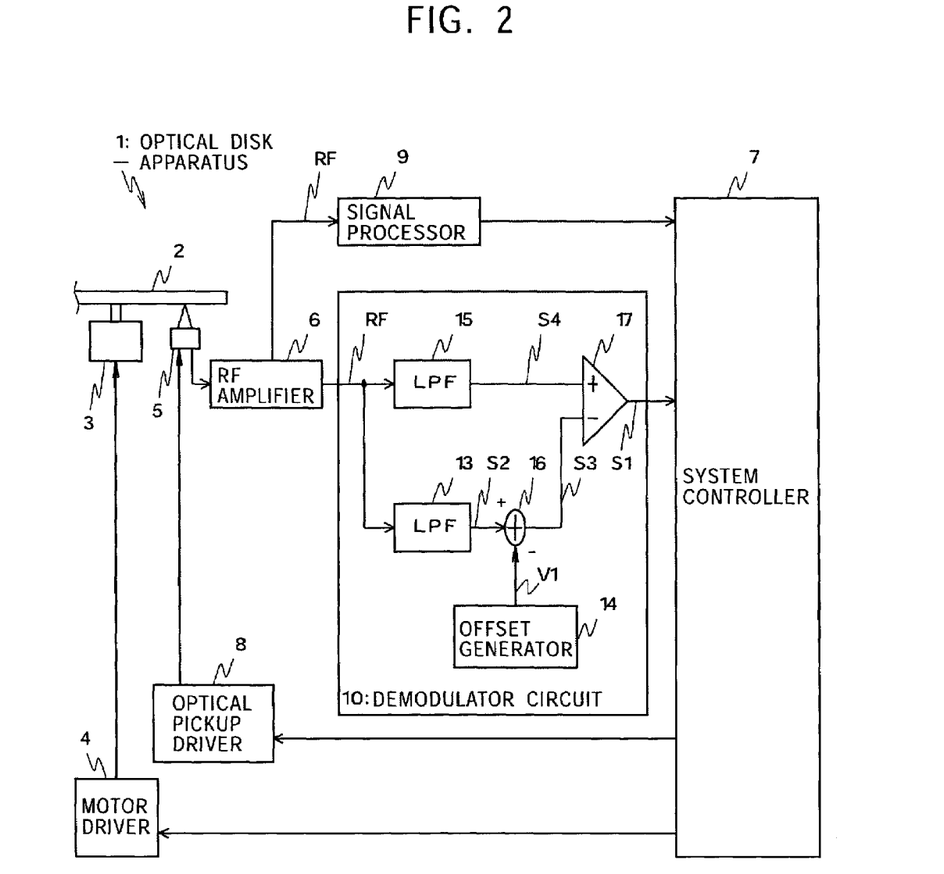
FIG. 2 is a block diagram illustrating an optical disk apparatus of a first embodiment of the present invention.

FIG. 2 is a block diagram illustrating an optical disk apparatus of a first embodiment of the present invention. The optical disk apparatus 1 records data to and/or plays back data from an optical disk 2 of DVD-ROM, DVD-RAM, DVD-R, DVD-RW type or other type.

In the optical disk apparatus 1, a spindle motor 3 driven by a motor driver 4 rotates the optical disk 2 at a predetermined rotational speed. A predetermined thread mechanism supports and moves an optical pickup 5 in a radial direction of the optical disk 2. The optical pickup 5 directs a laser beam to the optical disk 2, while receiving, at a predetermined photosensor, returning light of the laser beam. The optical pickup 5 outputs a signal responsive to the returning light to an RF amplifier 6. The optical pickup 5 under the control of an unshown driver circuit intermittently raises the amount of light of the laser beam directed to the optical disk 2. A row of pits is thus formed on the recordable optical disk 2 to record data on the optical disk 2.

The RF amplifier 6 current-to-voltage converts the signal output from the optical pickup 5 and processes the converted signal, thereby generating a playback signal RF which varies in signal level in accordance with a reflectance at a location of the optical disk 2 where the laser beam is directed, a tracking error signal which varies in signal level in accordance with a tracking error, and a focus error signal which varies in signal level in accordance with a focus error.

The motor driver 4 is controlled by a system controller 7 which functions in response to a clock that is obtained by processing the playback signal RF output from the RF amplifier 6. The motor driver 4 drives the spindle motor 3. Spindle control is thus performed in the optical disk apparatus 1. An optical pickup driver 8 is controlled by the system controller 7 which functions in response to the tracking error signal and the focus error signal. The optical pickup driver 8 moves an objective lens and causes the optical pickup 5 to perform a seek operation. Tracking control and focus control are thus performed in the optical disk apparatus 1. When the optical pickup 5 performs the seek operation, the laser beam is directed to the BCA, NBCA, etc.

A signal processor 9 plays back the clock from the playback signal RF, and processes the playback signal RF in accordance with the clock, thereby playing back data recorded in the optical disk 2.

The system controller 7, namely, a computer which controls the general operation of the optical disk apparatus 1, drives the motor driver 4, the optical pickup driver 8, etc. in response to the tracking error signal, the focus error signal, and a request from a host apparatus. When the optical disk 2 is loaded or when the power is then on in the optical disk apparatus 1, information required for data recording and/or data playback on the optical disk 2 is acquired from the optical disk 2. Based on the acquired information, the system controller 7 generally controls the optical disk apparatus 1 so that data is recorded to and/or played back from the optical disk 2 in response to a request from the host apparatus.

In these process steps, the system controller 7 determines whether the BCA or the NBCA is arranged on the optical disk 2 based on the information acquired from the optical disk 2 at the moment of power on. If it is determined that the BCA or the NBCA is arranged on the optical disk 2, the system controller 7 drives the motor driver 4, the optical pickup driver 8, etc. so that the BCA or the NBCA is sought. With the optical pickup 5 positioned at the BCA or the NBCA subsequent to the seek operation, a binary signal S1 output from a demodulator 10 is decoded. The management information recorded at the BCA or the NBCA is then played back.

When the management information recorded at the BCA or the NBCA is played back, the system controller 7 stores the management information in an internal memory. In accordance with the management based on the management information, and the information acquired at the startup and required for data recording and/or data playback, the system controller 7 controls the general operation of the optical disk 2 for data recording and/or data playback.

The demodulator 10 binarizes the playback signal RF with respect to a binarization threshold, thereby outputting the binary signal Si. Specifically, a low-pass filter (LPF) 13 in the demodulator 10 limits the bandwidth of the playback signal RF, thereby detecting and outputting an envelope signal S2 which varies in signal level in accordance with the envelope of the playback signal RF.

Figure 3:
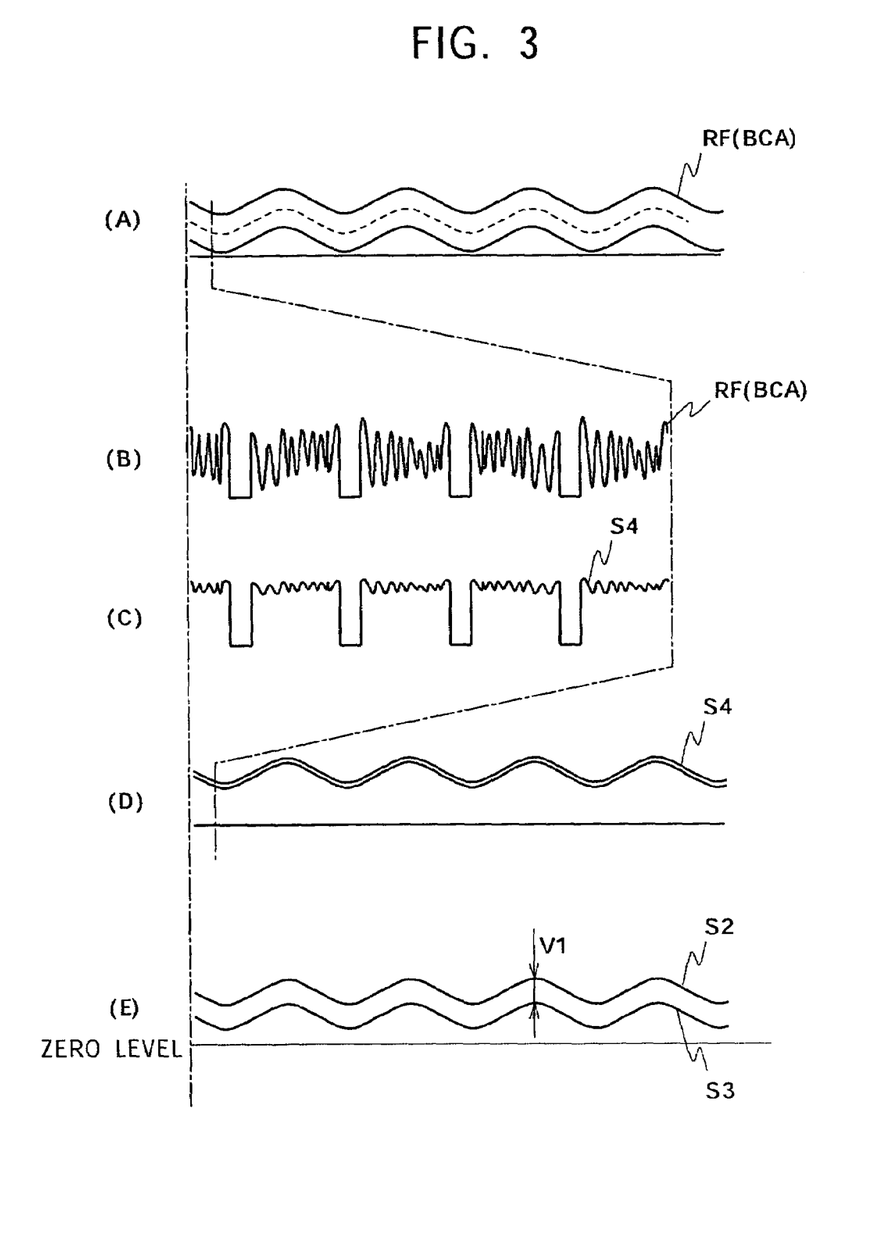
FIG. 3 is a signal waveform diagram illustrating the operation of the optical disk of FIG. 2.

If the optical disk 2 is of a DVD-ROM or DVD-RAM type in the optical disk apparatus 1, the BCA is set in a pre-pit area having embossed pits. Referring to FIGS. 3(A) and 3(B), the playback signal RF (BCA) obtained from the BCA varies in signal level in accordance with the management information recorded in the BCA. In contrast to this signal variation, a variation having a short period responsive to the pits formed in the optical disk 2 is observed. Also observed is a variation in signal level having a long period due to a decentered optical disk 2. With a cut-off frequency set therewithin, the low-pass filter 13 extracts a signal variation having a long period, thereby outputting the envelope signal S2 (see FIG. 3(E)).

Figure 4:
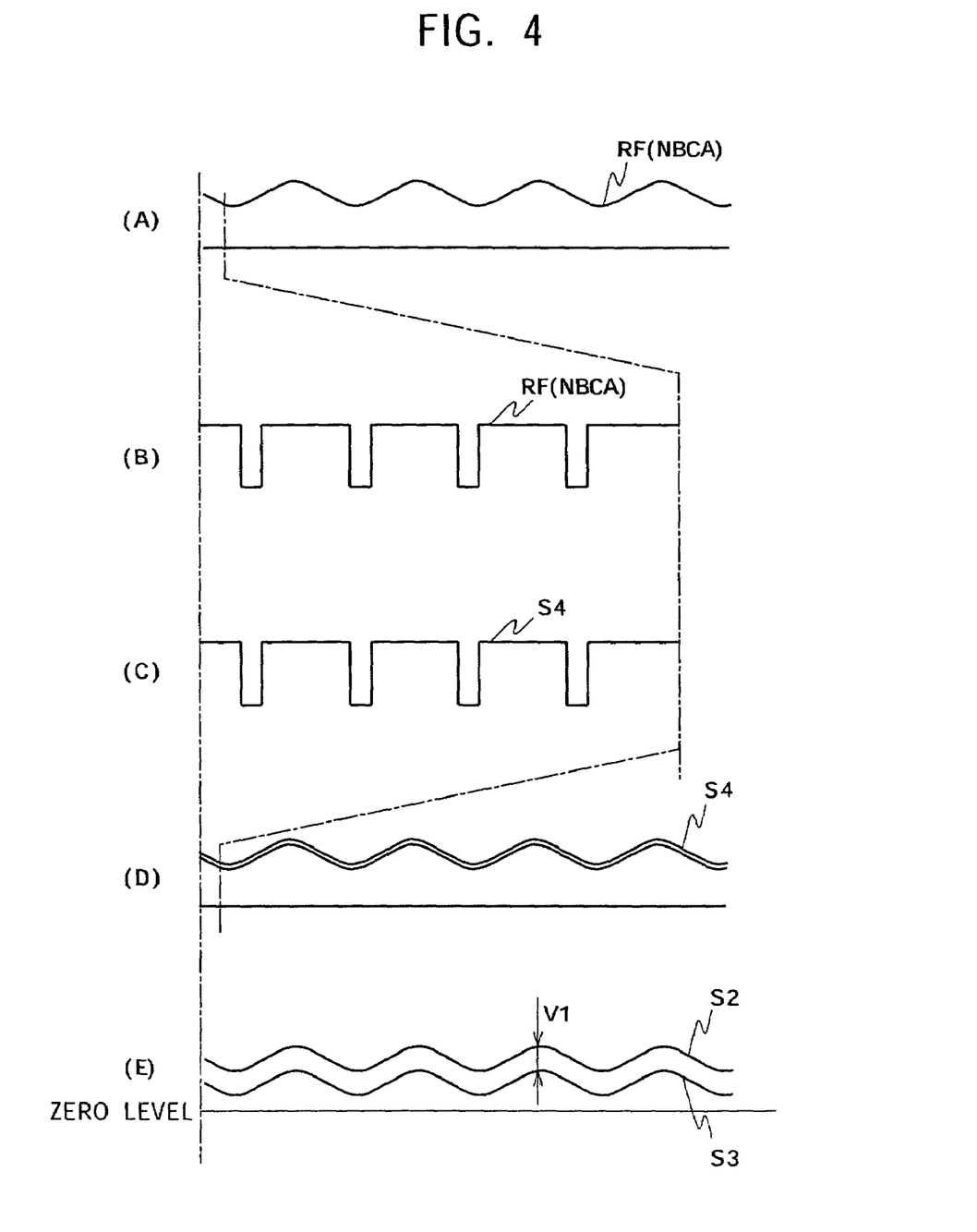
FIG. 4 is a signal waveform diagram illustrating the operation in which data is recorded on and/or played back from an NBCA in comparison with the waveform diagram of FIG. 3.

If the optical disk 2 is of a DVD-R or DVD-RW type, no pits are arranged in the NBCA. Referring to FIGS. 4(A) and 4(B), the playback signal RF (NBCA) obtained from the NBCA has a signal waveform of the playback signal RF (BCA) having no signal variation having the short period due to the pits. The low-pass filter 13 extracts the signal having the level varying with the long period, thereby outputting the envelope signal S2 (see FIG. 4(E)).

If the rotational speed of the optical disk 2 is set to 20 [Hz], a cut-off frequency of 20 [kHz] is set in the low-pass filter 13. The playback signal RF (BCA) obtained from the BCA becomes the envelope signal S2 having the long signal variation having the long period as a result of removing the signal level variation having the short period due to the pits.

As the playback signal RF (BCA) obtained from the BCA, the playback signal RF (NBCA) from the NBCA also becomes the envelope signal S2.

An offset generator 14 generates and outputs an offset voltage V1, which is a predetermined DC voltage. A substracter 16 subtracts the offset voltage V1 from the envelope signal S2, thereby outputting a binarization threshold signal S3 (see FIGS. 3(E) and 4(E)). The demodulator 10 thus generates the binarization threshold signal S3, which serves as a reference for binarizing the playback signal RF, based on the envelope of the playback signal RF.

A low-pass filter (LPF) 15 has a cut-off frequency which limits only a variation having a short period contained in the playback signal RF (BCA) obtained from the BCA. The low-pass filter 15 thus outputs the playback signal RF output from the RF amplifier 6 with the bandwidth thereof limited. When the playback signal RF (BCA) obtained from the BCA is processed, the low-pass filter 15 suppresses a signal level variation having the short period due to the pits and provides an output signal S4 which varies in signal level in response to a record in a bar-code form in the BCA, and has a signal level variation having a long period (see FIGS. 3(C) and 3(D)). When the playback signal RF (NBCA) obtained from the NBCA is processed, there is no signal variation arising from the pits in the playback signal RF (NBCA), and the output signal S4 with the signal level thereof varying in response to the record in the bar-code form in the NBCA and having the long period is output (see FIGS. 4(C) and 4(D)).

Specifically, when the rotational speed of the optical disk 2 is set to 20 [Hz], a cut-off frequency of 400 [kHz] is set in the low-pass filter 15.

A comparator 17 outputs the binary signal S1 of the playback signal RF by recognizing the output signal S4 of the low-pass filter 15 according to the binarization threshold signal S3.

(2) Operation of the First Embodiment

When the optical disk apparatus 1 detects the loading of the optical disk 2, or when the power is on, the optical pickup 5 under the control of the system controller 7 seeks an inner track of the optical disk 2, and then plays back the information required to record data to and/or play back data from the optical disk 2. If the information indicates that the BCA or the NBCA is formed in the optical disk 2, the system controller 7 causes the optical pickup 5 to seek these areas.

When the optical pickup 5 is positioned at the BCA or the NBCA in the optical disk apparatus 1, the optical pickup 5 receives returning light reflected from the optical disk 2 to which the optical pickup 5 directs a laser beam, with the tracking control of the optical pickup driver 8 suspended. The RF amplifier 6 processes the signal corresponding to the returning light, thereby detecting the playback signal RF (see FIGS. 3(A) and 3(B), and FIGS. 4(A) and 4(B)) which varies in signal level in response to the reflectance of a laser beam focused position on the optical disk 2. The playback signal RF is input to the low-pass filter 13 in the demodulator 10. The low-pass filter 13 extracts the envelope signal S2, namely, the signal component having the signal level varying with the long period of the playback signal RF (see FIGS. 3(E) and 4(E)). The substracter 16 offsets the envelope signal S2 by the offset voltage V1, hereby generating the binarization threshold signal S3 as a reference signal for binarizing the playback signal RF.

The low-pass filter 15 suppresses the signal level variation of the playback signal RF having the short period due to the pits (see FIGS. 3(C) and 3(D), and FIGS. 4(C) and (D)). The output signal S4 of the low-pass filter 15 is determined according to the binarization threshold signal S3, thereby becoming the binary signal S1. The system controller 7 in the optical disk apparatus 1 decodes the binary signal S1, thereby playing back the management signal.

The optical disk apparatus 1 generates the binarization threshold signal S3 for binarizing the playback signal RF based on the envelope of the playback signal RF. Even if a decentered optical disk varies the playback signal RF in signal level with a long period, the playback signal RF is binarized with respect to a reference responsive to the signal level. Even if the degree of modulation becomes different from disk to disk with the amplitude of the playback signal RF changing substantially, the playback signal RF is binarized using the reference value responsive to the change. The optical disk apparatus 1 reliably plays back the management information recorded in the bar-code form on a variety of optical disks.

According to the results of experiments, the playback signal RF is reliably binarized if the playback signal RF output from the RF amplifier 6 has an amplitude of 1 [V] even when the signal level of the playback signal RF varies because of variations in gain of the RF amplifier 6 and variations in the amount of light of the laser beam.

(3) Advantages of the First Embodiment

The binarization threshold is generated by offsetting the envelope of the playback signal, and the playback signal is binarized using the binarization threshold. The management information recorded in the bar-code form on a variety of optical disks is reliably played back.

The envelope of the playback signal is detected using the low-pass filter. This simple arrangement allows the management information to be reliably detected.

The offset generator 14 as the offset voltage generator means generates the offset voltage V1. The substracter 16 subtracts the offset voltage V1 from the envelope signal, thereby generating the binarization threshold. With the offset voltage V1 set and switched as necessary, the binarization threshold is maintained at an appropriate signal level, and the management information is thus reliably played back.

(4) Second Embodiment

Figure 5:
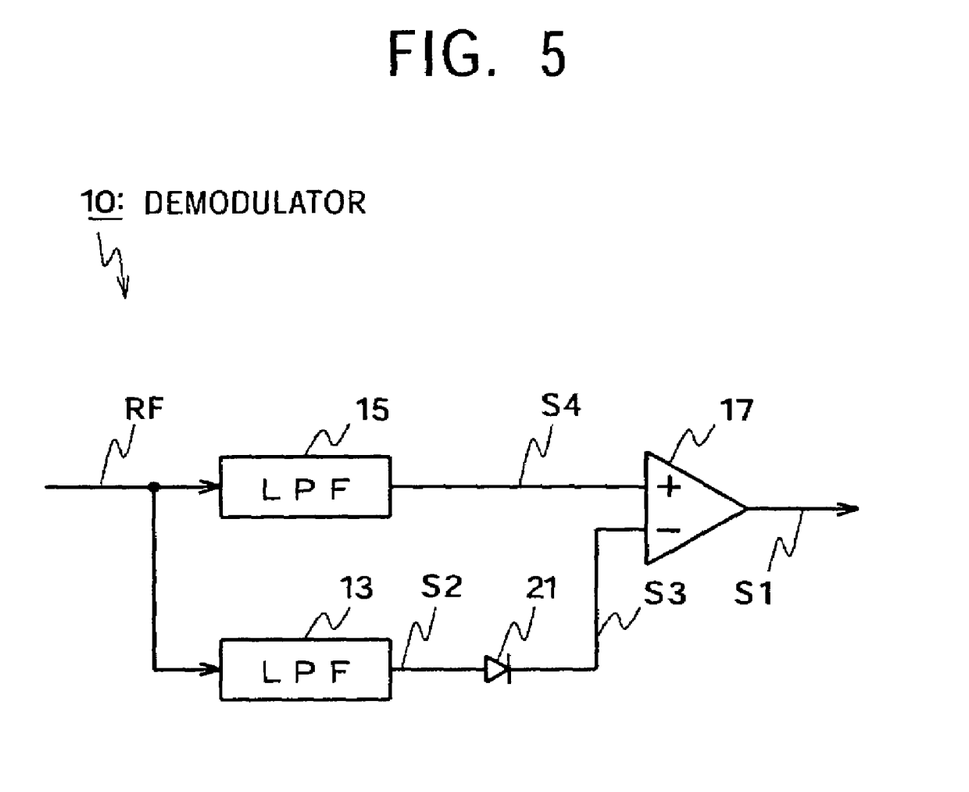
FIG. 5 is a block diagram illustrating a demodulator applied to an optical disk apparatus of a second embodiment of the present invention.

FIG. 5 is a block diagram illustrating a demodulator that is incorporated in the optical disk of a second embodiment of the present invention. The optical disk apparatus of the second embodiment is identical in construction to the optical disk apparatus 1 of the first embodiment except that the demodulator 20 is used instead of the demodulator 10.

Rather than using the offset generator 14 and the substracter 16, the demodulator 20 uses a diode 21 to offset the envelope signal S2 by the forward voltage drop thereof, thereby generating the binarization threshold signal S3.

In the arrangement shown in FIG. 5, the diode adds the forward voltage drop as the offset voltage to the envelop signal, thereby generating the binarization threshold signal. This arrangement simpler in construction than that of the first embodiment still provides the same advantage as that of the first embodiment.

(5) Alternate Embodiments

The low-pass filter forms the envelope detector means in each of the above embodiments. The present invention is not limited to this arrangement. The envelope detector means may be any of a variety of arrangements. For example, the envelope detector means may be fabricated of a peak-hold circuit, or an envelope detector circuit.

In the above embodiments, data is recorded to and/or played back from the optical disks in compliance with so-called DVD standards. The present invention is not limited to this arrangement. The present invention is widely applied to the case in which data is recorded to and/or played back from an optical disk which has the management information recorded in the bar-code form.

In accordance with the present invention, the offset is added to the envelope of the playback signal, and the binarization threshold is generated. The playback signal is binarized using the binarization threshold. The management information recorded in the bar-code form is reliably played back from any of a variety of optical disks.

INDUSTRIAL APPLICABILITY

The present invention relates to an optical disk apparatus and a recording method and/or a playback method of an optical disk, and is applied to an optical disk apparatus that records data to and/or plays back data from an optical disk complied with the DVD standards.

The invention claimed is:

1. An optical disk apparatus for recording data to and/or playing back data recorded on an optical disk in a format of a plurality of formats by directing a laser beam to the optical disk, comprising:
    playback signal generator means for receiving returning light of the laser beam, and for generating a playback signal which varies in signal level in accordance with the reflectance at a location of the optical disk where the laser beam is directed and based on the format of the optical disk;
    a system controller for determining the format of the optical disk from the plurality of formats and operating an optical pickup associated with the playback signal generator means in a first mode to seek management information recorded on a burst cutting area of the optical disk and in a second mode to seek management information recorded on a narrow burst cutting area of the optical disk, depending on the determined format of the optical disk;
    envelope detector means for detecting an envelope signal of the playback signal;
    offset means for generating a binarization threshold signal by offsetting the envelope signal by an offset voltage, the binarization threshold signal varies based on the format of the optical disk;
    bandwidth limiter means for limiting a high-frequency signal level variation of the playback signal;
    binarizing means for binarizing an output signal of the bandwidth limiter means according to the binarization threshold signal as a reference to generate a binary signal; and
    decoder means for decoding the binary signal to demodulate management information recorded in a bar-code form on the optical disk.

2. An optical disk apparatus according to claim 1, wherein the envelope detector means is a low-pass filter.

3. An optical disk apparatus according to claim 1, wherein the offset means comprises an offset voltage generator for generating the offset voltage, and a subtracter circuit for offsetting the envelope signal by the offset voltage.

4. An optical disk apparatus according to claim 1, wherein the offset means comprises a diode and wherein the envelope signal is offset by the offset voltage which is a forward voltage drop of the diode.

5. An optical disk apparatus according to claim 1, wherein management information in a bar-code form is recorded on an inner track of the optical disk.

6. An optical disk apparatus which records data to and/or plays back data recorded on an optical disk in a format of a plurality of different formats by directing a laser beam to the optical disk, comprising:
    a light source that directs the laser beam to a region which is arranged on an inner track of the optical disk and on which management information is recorded in a bar-code form,
    playback signal generator means for receiving returning light of the laser beam, and for generating a playback signal which varies in signal level in accordance with the reflectance at a location of the optical disk where the laser beam is directed and based on the format of the optical disk,
    a system controller which determines the format of the optical disk from the plurality of formats and operates an optical pickup associated with the playback signal generator means in a first mode to seek management information recorded on a burst cutting area of the optical disk and in a second mode to seek management information recorded on a narrow burst cutting area of the optical disk, depending on the determined format of the optical disk,
    envelope detector means which detects an envelope signal of the playback signal,
    offset means which generates a binarization threshold signal by offsetting the envelope signal by an offset voltage, which binarization threshold signal varies based on the format of the optical disk,
    bandwidth limiter means which limits a high-frequency signal level variation of the playback signal,
    binarizing means which binarizes an output signal of the bandwidth limiter means according to the binarization threshold signal as a reference to generate a binary signal, and
    decoder means which decodes the binary signal to demodulate management information recorded in a bar-code form on the optical disk.

7. An optical disk apparatus according to claim 6, wherein the offset means comprises an offset voltage generator for generating the offset voltage, and a subtracter circuit for offsetting the envelope signal by the offset voltage.

8. An optical disk apparatus according to claim 6, wherein the offset means comprises a diode and wherein the envelope signal is offset by the offset voltage which is a forward voltage drop of the diode.

9. A method for recording data on an optical disk and/or playing back data recorded on the optical disk in a format of a plurality of different formats by directing a laser beam to the optical disk, comprising the steps of:
    determining the format of the optical disk from the plurality of formats,
    directing the laser beam to a region which is arranged on an inner track of the optical disk and on which management information is recorded, in a first mode when the management information is recorded on a burst cutting area of the optical disk and in a second mode when the management information is recorded on a narrow burst cutting area of the optical disk, depending on the format of the optical disk, detecting an envelope signal from a playback signal which varies in signal level in accordance with the reflectance at a location of the optical disk where the laser beam is directed, when returning light of the laser beam is received and in accordance with the format of the optical disk, generating a binarization threshold signal by offsetting the envelope signal by an offset voltage, which binarization threshold signal varies based on the format of the optical disk, binarizing the playback signal according to the binarization threshold signal as a reference to generate a binary signal, subsequent to limiting a high-frequency signal level variation of the playback signal, decoding the binary signal to demodulate the management information recorded in a bar-code form on the optical disk, and recording data on the optical disk and/or playing back data from the optical disk referencing the demodulated management data.

10. An optical disk apparatus configured to at least one of record and playback data on an optical disk in a format of a plurality of formats, comprising:

a playback signal generator configured to receive returning light of a laser beam, and to generate a playback signal which varies in signal level in accordance with a reflectance at a location of the optical disk where the laser beam is directed and based on the format of the optical disk;

a system controller configured to determine the format of the optical disk from the plurality of formats and to operate an optical pickup associated with the playback signal generator in a first mode to seek management information recorded on a burst cutting area of the optical disk and in a second mode to seek management information recorded on a narrow burst cutting area of the optical disk, depending on the determined format of the optical disk;

an envelope detector configured to detect an envelope signal of the playback signal;

an offset signal generator configured to generate a binarization threshold signal by offsetting the envelope signal by an offset voltage, the binarization threshold signal varying based on the format of the optical disk;

a bandwidth limiter configured to limit a high-frequency signal level variation of the playback signal;

a binarizing signal generator configured to binarize an output signal of the bandwidth limiter according to the binarization threshold signal as a reference to generate a binary signal; and a decoder configured to decode the binary signal to demodulate the management information on the optical disk.

* * * * *